United States Patent [19]

Gorman et al.

[11] 4,260,404

[45] Apr. 7, 1981

[54] METHOD FOR REDUCING ROLL MARKING OF GLASS SHEETS

[75] Inventors: Harold R. Gorman, Oakmont; Leonard R. Plocki, Natrona Heights, both of Pa.

[73] Assignee: PPG Industries, Inc., Pittsburgh, Pa.

[21] Appl. No.: 37,243

[22] Filed: May 9, 1979

[51] Int. Cl.$^3$ ............................................. C03B 35/18
[52] U.S. Cl. ........................................ 65/27; 65/118; 65/348; 65/374 RM; 29/115; 29/116 AD
[58] Field of Search ............ 29/115, 116 R, 116 AD; 65/348, 349, 350, 351, 27, 118, 374 RM; 106/38.27

[56] References Cited

U.S. PATENT DOCUMENTS

| | | |
|---|---|---|
| 3,492,109 | 1/1970 | Robinson et al. ................... 65/193 |
| 3,783,013 | 1/1974 | Seeman ........................ 106/38.27 X |
| 3,853,525 | 12/1974 | Gorman ................................ 65/181 |

Primary Examiner—Arthur D. Kellogg
Attorney, Agent, or Firm—Donna L. Seidel

[57] ABSTRACT

A method for reducing roll marking of glass sheets is disclosed whereby metal rolls are coated in situ with a boron nitride film.

5 Claims, No Drawings

METHOD FOR REDUCING ROLL MARKING OF GLASS SHEETS

FIELD OF THE INVENTION

The present invention relates generally to the art of reducing roll marking of glass sheets and more particularly to the art of reducing roll marking by forming a protective coating on the rolls.

THE PRIOR ART

In the glass industry, rolls for supporting and conveying glass sheets are subjected to very high temperatures; e.g., take off rolls in a float glass line or conveyor rolls in a tempering or annealing lehr. Since temperatures of 900° to 1600° F. (482° to 871° C.) are not uncommon in the glass making operation, rolls are generally made from a heat resistant material such as asbestos or stainless steel. Although asbestos rolls are used extensively in the glass industry, they have several disadvantages such as the tendency to deform as a result of continuous contact with hot glass. When this occurs, the out-of-round rolls mar the bottom surface of the glass, a defect known as roll scuffing. Although metal rolls are not as prone to deformation, the metal may oxidize and oxide deposits on the roll surface, including tin oxide which may be transported from the bath by the glass, can make imprints on the glass surface.

In addition to the above-described defects relating to the marking of glass sheets, another problem encountered in the glass producing environment is short roll life. The continuous passing of hot glass over rolls causes such wear that the rolls, particularly asbestos rolls, have relatively short lives. Depending on the temperature, determined by the location of the roll, typical roll life may vary from about a week for take off rolls which are in a 1200° to 1600° F. (649° to 871° C.) environment to several months for lehr rolls in the 200° to 600° F. (93° to 316° C.) range.

An asbestos roll with a boron nitride coating found to prolong roll life and to minimize deformation of the roll and adhesion to the glass surface is disclosed in U.S. Pat. No. 3,853,525 to Gorman. The roll is prepared by adhering asbestos discs together on a mandrel, spraying on a solution of boron nitride, air drying for 1 to 10 hours at room temperature to 200° F. (93° C.), then baking at 200° to 1500° F. (93° to 815° C.) for 2 to 6 hours before installing the roll in a glass producing apparatus.

In U.S. Pat. No. 3,492,109 to Robinson et al, boron nitride is disclosed for use in the glass engaging rolls of a float glass tank.

In U.S. Pat. No. 3,783,013, Seeman discloses coating metal glassware molds with a dispersion of 12 to 53 percent by weight monoaluminum phosphate and 47 to 88 percent by weight boron nitride.

SUMMARY OF THE INVENTION

The present invention involves a method for reducing roll marking of glass sheets in a continuous glass producing or treating operation by coating metal rolls in situ to form a boron nitride coating which prevents oxidation of the metal rolls and also prevents build up of any deposits which can cause imprinting defects.

During the course of operation of a glass production or treatment line, a roll coating may wear at high load points. However, since the boron nitride is applied in situ according to the present invention, spot recoating can be accomplished with minimum down time of the production line.

DESCRIPTION OF THE PREFERRED EMBODIMENTS

Rolls for supporting glass sheets may be formed from conventional stainless steel; for example, compositions of 20 to 25 percent chromium, 12 to 20 percent nickel and the balance iron. For certain applications other alloys may be preferred such as those compositions of about 2 percent iron, at least 10 percent cobalt and at least 3 percent tungsten as described in U.S. Pat. No. 3,443,922.

The rolls are contacted in place at any temperature which the coating apparatus can withstand with an aqueous suspension of boron nitride. The coating apparatus may be a brush, roller, spray gun, etc. Spraying is preferred where feasible because a very uniform adherent coating is produced. However, good results can be achieved with a brush or roller where temperature or space constraints prohibit spraying.

Aqueous boron nitride compositions useful according to the present invention are commercially available from Carborundum Corporation under the trademark COMBAT ®. These compositions are typically gels of boron nitride which contain a high temperature inorganic binder such as aluminum oxide, magnesium silicate or zirconium oxide in aqueous medium. Preferred compositions include the Type S, a boron nitride gel of the Carborundum COMBAT ® series as well as the Type V.

In a method for treating flat glass sheeting supported by metal rolls, whatever the treatment, e.g. annealing, coating, etc., particularly at elevated temperatures, whenever roll marking defects begin to appear on the glass surface, the metal rolls are contacted with an aqueous solution comprising about 4 to 5 volumes of water per volume of concentrated boron nitride gel. As soon as the coating has set, the time required varying inversely with the temperature, the glass treatment process is resumed. The roll treatment according to the present invention may be repeated as often as necessary to reduce roll marking of the glass and allows the stainless steel rolls to remain in place and in operation for extended periods of time, thus increasing the efficiency of the glass treatment process. An additional advantage of the present invention is that the steam generated by he application of the aqueous composition in situ removes adherent particulate contamination deposited on the rolls.

The present invention will be further understood from the description of specific examples which follow.

EXAMPLE I

On a glass production line, whereupon flat glass sheeting being treated is exhibiting unacceptable roll marking, existing untreated stainless steel rolls from the take-off position through the annealing lehr, where temperatures range up to 1530° F. (832° C.), are contacted with an aqueous composition comprising 1 part of a boron nitride gel comprising 60 percent water and 4 parts additional water. The boron nitride gel is commercially available from Carborundum Corporation as COMBAT ® Type S coating composition and comprises 85 parts boron nitride to 15 parts aluminum oxide. The aqueous composition is applied with long handled brushes. When flat glass sheeting is again brought into contact with the boron nitride coated stainless steel rolls, the roll marking defects are substantially reduced.

EXAMPLE II

Stainless steel rolls are contacted as in Example I with an aqueous composition comprising 5 volumes of water per volume of a boron nitride gel available from Carborundum Corporation as COMBAT® Type V which differs from Type S in that magnesium silicate, rather than aluminum oxide, is used in ratio of 92 parts boron nitride to 8 parts magnesium silicate. Again, a boron nitride coating is formed which substantially reduces roll marking of the glass sheeting.

The above examples are offered to illustrate the present invention, the scope of which is defined by the following claims.

We claim:

1. In a method for treating flat glass sheeting which is supported by rotatable metal rolls adaptable to convey said glass wherein roll marking defects increase as the roll surface deteriorates, the improvement which comprises the steps of:
   a. briefly interrupting the glass treatment;
   b. applying in situ at substantially operating temperature an aqueous composition consisting essentially of boron nitride and a high temperature binder selected from the group consisting of aluminum oxide, magnesium silicate and zirconium oxide to deposit a coating on the roll surface;
   c. allowing said coating to set; and
   d. resuming the glass treatment process.

2. The improved method according to claim 1, wherein the high temperature binder comprises aluminum oxide.

3. The improved method according to claim 1, wherein the high temperature binder comprises magnesium silicate.

4. The improved method according to claim 1, wherein the high temperature binder comprises zirconium oxide.

5. The improved method according to claim 1, wherein the composition comprises sufficient water to result in the generation of steam sufficient to dislodge adherent particulate contaminants from the rolls.

* * * * *